United States Patent [19]

Connole et al.

[11] 3,861,978

[45] Jan. 21, 1975

[54] METHOD OF JOINING TWO BODIES AFTER TREATMENT WITH AN INORGANIC COLLOID

[75] Inventors: Kent Brian Connole; Wesley Peter Townsend, both of East Windsor Township, Mercer County, N.J.

[73] Assignee: Western Electric Company, Incorporated, New York, N.Y.

[22] Filed: Mar. 8, 1973

[21] Appl. No.: 339,459

[52] U.S. Cl. ............... 156/308, 106/286, 156/307, 156/330, 252/313 R
[51] Int. Cl. .................... C09j 5/02, B32b 31/12
[58] Field of Search ......... 106/286; 117/47 A, 47 R, 117/169 R, 213; 156/276, 307, 308, 330; 161/411; 252/313 R

[56] References Cited
UNITED STATES PATENTS 3,361,589   1/1968   Lindsey .............................. 117/118
3,657,003   4/1972   Kenney .............................. 117/120
3,767,590   10/1973  Kenney .......................... 252/313 R

*Primary Examiner*—Charles E. Van Horn
*Assistant Examiner*—Robert A. Dawson
*Attorney, Agent, or Firm*—J. Rosenstock

[57] ABSTRACT

A method of joining two bodies is disclosed. The method comprises treating a contacting region of a surface of at least one of the bodies with a stable aqueous colloidal solution comprising insoluble hydrous oxide particles of a selected element. Subsequent to the colloidal solution treating step or prior thereto, an adhesive is applied to a contacting region of a surface of at least one of the bodies. The thus adhesive and colloidal solution-treated contacting surfaces are mated or contacted together to obtain a joining thereof. The joined surfaces may then be further treated, if necessary, to obtain a relatively permanent joint or joining thereof.

11 Claims, No Drawings

METHOD OF JOINING TWO BODIES AFTER TREATMENT WITH AN INORGANIC COLLOID

BACKGROUND OF THE INVENTION

1. Field of the Invention

This invention relates to a method of joining two bodies and more particularly, to a method of improving the joint strength of adherends by applying a colloidal hydrous oxide solution of a selected element thereto.

2. Description of the Prior Art

With the advent of synthetic polymer synthesis and printed circuit board fabrication came a need for new and more efficient means of attaining bonding, joining and adhesion generally. Adhesion (adherence) is the phenomenon in which surfaces are held together by interfacial forces. Strength and structural problems are often encountered in the formation of adhesive joints or bonds whereby failure may occur at (1) the interface between an adherend, i.e., a body that is held to another body by an adhesive, and the adhesive or (2) cohesively, i.e., failure in the bulk phase of the adhesive or one of the adherends when the interfacial strength is quite high.

The former problem is often alleviated by empirical means, to improve wettability of the adhesive to the bodies to be joined, such as roughening the surfaces to be joined or polishing the surfaces to be joined, such means often being dependent upon the adherends themselves and the adhesives employed.

It is therefore desirable to achieve a method of treating adherends, to attain greater joint strength therebetween, which is universal and not empirical and therefore is not dependent upon surface roughness, smoothness or wettability. Such a treatment is an object of this invention.

SUMMARY OF THE INVENTION

This invention relates to a method of joining two bodies and more particularly, to improving the joint strength of adherends by applying a colloidal hydrous oxide solution of a selected element thereto.

A contacting region of a surface of at least one body, destined to be adhesively joined, is treated with a stable aqueous colloidal solution, formed by a hydrolysis and nucleation reaction, comprising insoluble hydrous oxide particles of one or more elements selected from the group consisting of Be, Mg, Ti, Zr, V, Cr, Mo, W, Mn, Fe, Co, Ni, Pd, Pt, Cu, Ag, Au, Zn, Cd, Ag, Al, In, Tl, Si, Ge, Sn, Pb, Bi, La, Ce, Th, U and mixtures thereof, the particles having a size within the range of 10A to 10,000A and the hydrolysis reaction including at least (1) dissolution of a salt of the selected element in an aqueous medium and (2) maintenance of the pH of the aqueous medium at a point where no flocculate results. An adhesive is applied to a contacting region of a surface of at least one of the bodies, destined to be adhesively joined. The respective contacting regions, subsequent to the steps of colloid solution treating and applying adhesive, are then contacted together to obtain a joining thereof. The contacted regions may then be further treated to achieve the desired relatively permanent joint.

DETAILED DESCRIPTION

The present invention has been discussed primarily in terms of joining bodies or substrates (adherends) by treating one adherend surface, prior to adhesive contact thereof, with an aqueous colloidal hydrous oxide solution of a selected element. It will be readily appreciated that the inventive concept is equally applicable to treating the entire surface area or regions thereof. Also, both adherend surfaces can be treated with the colloidal hydrous oxide solution either before or after adhesive contact of or application to one or both of their respective contacting surfaces.

For purposes of the present invention, the following terms are defined as follows:

1. an adherend is a body or substrate that is held to another body or substrate by an adhesive;
2. an adhesive is a substance capable of holding materials together by surface attachment;
3. a joint is the location at which two adherends are held together; and
4. cohesive failure is failure in the bulk phase of either the adhesive or one of the adherends (not at the interface between the two).

A suitable adherend is selected. Suitable adherends may comprise any material depending upon its ultimate use. For the production of electrical circuit patterns, suitable adherends may comprise non-conductive material (dielectric material), e.g., organic polymer boards, and conductive material, e.g., metal films or patterns. It is, of course, to be understood that the adherends destined to be joined may comprise the same material or be of different materials.

A defined surface contacting region of a first adherend, destined to be contacted by an adhesive and joined to a defined surface contacting region of a second adherend may first be cleaned to remove any contaminant films, particles, etc., which normally interfere with adhesion. Such contaminating films and particles, etc., are well known in the adhesion art as well as the conventional cleaning procedures used therein and elaboration thereon herein is unnecessary. Such contaminants and cleaning techniques are revealed in part in *Adhesion and Bonding*, N. M. Bikales, editor, Wiley-Interscience (1971).

The adherend surface region is then treated, by any conventional means, e.g., dipping, spraying, etc., with a suitable colloidal hydrous oxide solution. A suitable colloidal hydrous oxide solution includes at least one aqueous colloidal solution revealed in Kenney, U.S. Pat. No. 3,657,003, filed Feb. 2, 1970, assigned to the assignee hereof and incorporated by reference herein. Such a solution is described as a stable colloidal solution formed by a controlled hydrolysis and nucleation reaction in an aqueous medium wherein colloidal particles of the colloidal wetting solution (1) have a size within the range of 10A to 10,000A and (2) comprise an insoluble hydrous oxide of one or more selected elements. The term "hydrous oxide" is as defined in Kenney, U.S. Pat. No. 3,657,003, referred to above, namely as an insoluble oxide, an insoluble hydroxide, an insoluble oxide-hydroxide, or an insoluble mixture of an oxide and a hydroxide (including all permutations and combinations of the oxides and/or hydroxides revealed in Kenney, U.S. Pat. No. 3,657,003). The hydrolysis reaction includes dissolving a salt of the selected element in the aqueous medium and maintaining the pH of the aqueous medium at a point where no flocculate results. Some suitable elements include Be, Mg, Ti, Zr, V, Cr, Mo, W, Mn, Fe, Co, Ni, Pd, Pt, Cu, Ag, Au, Zn, Cd, Hg, Al, In, Tl, Si, Ge, Sn, Pb, Bi, La, Ce, Th and U. Specifically, the solutions include Examples I-A to XXXIII-L, inclusively, revealed in Kenney, U.S. Pat. No. 3,657,003, referred to above. It is to be noted and stressed here that either one or both of the respective defined adherend surface regions, destined to be contacted by a suitable adhesive and joined together, may be treated by the aqueous colloidal hydrous oxide solution prior to their contacting with the adhesive.

A suitable adhesive is applied to a defined surface region of at least one adherend. A suitable adhesive is any one of many adhesives known to those skilled in the art including protein adhesives, cements, glues, mucilage, pastes, etc., which may be liquid, solid, cold setting, hot setting, pressure sensitive, etc. The type of adhesive employed is dependent upon the adherends employed, the ultimate use of the joined adherends, etc., i.e., those factors or criteria well known in the adhesives art to those skilled therein. Typically, the adhesive selected should (1) have sufficiently high permanence, (2) have sufficiently high cohesive strength, (3) have sufficiently high specific adhesion, (4) be reproducible in the results it achieves and (5) should withstand or resist the ambient conditions, e.g., temperature, corrosive gases or liquids, etc., to which the joined adherends are destined to be ultimately exposed. The selected adhesive may be applied, by any conventional means, e.g., brushing, spraying, dipping, etc., to only one adherend surface region, destined to be ultimately joined, or to both surface regions of both adherends destined to be joined.

It is to be noted at this point, that alternatively, the suitable adhesive can be applied to the defined adherend surface region, to be contacted and joined, (one surface or both surfaces or surface regions, as the case may be) prior to treating either one of the surface regions or both surface regions with the suitable aqueous colloidal hydrous oxide solution. Unlike other prior art methods, the inventive method is not dependent on the surface topography of the adherends, i.e., the applied aqueous colloidal hydrous oxide solutions do not enhance either the roughness or the smoothness of the contacting surfaces or regions of the adherends. Therefore, the mode whereby the colloid solution treatment improves the strength of the resultant joint is not as yet known or explainable. Thus, the sequence of treating the surface regions, destined to be adhesively joined, with the colloidal solution and the adhesive is not critical and the sequence of those steps may be reversed whereby the final joint strength achieved remains the same.

After the adhesive is applied to one adherend region or both adherend regions, the surface regions destined to be joined are arranged to face one another and then the facing regions are placed together into intimate contact, thereby joining the adherends. Depending upon the adhesive employed, the joined adherends may then be treated if necessary, whereby the resulting joining is rendered relatively permanent. The treatment whereby the joining is rendered relatively permanent depends upon the adherends and adhesives employed. Some typical treatments include (1) cooling a hot melt adhesive, (2) evaporating an organic solvent cement, (3) applying pressure to a pressure-sensitive adhesive, (4) polymerizing in situ a thermosetting adhesive, such as by heating or ultraviolet light exposure. The adhesives, their application, and final bonding treatment are well known in the art and will not be elaborated herein. Again, reference is made to *Adhesion and Bonding*, where some of the parameters, factors and considerations are given.

EXAMPLE I

A. For comparison purposes, a commercially available polyimide film, made from the anhydride of pyromellitic acid and 4,4′ diamino-diphenyl ether, having the general formula

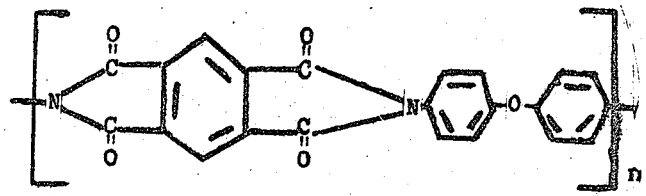

where $n$ is an integer ranging from about 150 to 650 and having an average molecular weight ranging from 60,000 to 250,000 was selected as a first adherend.

A surface of a second adherend, comprising an aluminum plate commercially obtained, was coated with a commercially obtained uncured (liquid) bisphenol A-epichlorohydrin epoxy adhesive (epoxide equivalent of 175 to 210 and an average molecular weight of 350 to 400) having a conventional amine curing catalyst contained therein. A surface region of the first adherend was then put into intimate contact with the epoxy-coated aluminum adherend thereby joining the adherend. The contacted adherends were then heated at 90°C for 2 hours whereby the adhesive resin was cured to a thermoset state and the adherends were adhesively joined in a relatively permanent state.

The joint strength was then determined by subjecting the first adherend to a commercial joint or bond strength testing apparatus whereby a peel or adhesion strength of 240 gms./in. was obtained (90° peel at a peel rate of 0.2 in./min.).

The topography of the first adherend surface region was examined microscopically for comparison purposes (prior to adhesive joining).

B. The procedure of Example I-A was repeated except that an aqueous colloidal solution comprising a hydrous oxide of tin was prepared by first dissolving 1 weight percent of $SnCl_4 \cdot 5H_2O$ in 100 ml. of deionized water. 2 weight percent of $SnCl_2 \cdot 2H_2O$ was then dissolved in the resultant solution. Finally, 1.5 weight percent of $SnCl_2 \cdot 2H_2O$ was added and dissolved therein to form a colloidal solution. A portion of the first adherend was then immersed in the colloidal solution, for 2 minutes at 25°C, whereby a defined surface contacting region, destined to be joined to a second adherend, was coated thereby.

Microscopic examination of the first aherend contacting region indicated no change in the topography thereof (roughness or smoothness) as compared to the first adherend in Example I-A above.

The joint strength obtained was 620 gms./in. which was much greater than the strength of the joint not colloid treated in Example I-A.

C. The procedure of Example I-B was repeated except that an aqueous colloidal solution comprising a hydrous oxide of iron was prepared. In 100 ml. of deionized water, maintained at 24°C, was dissolved 1 weight percent $FeCl_3 \cdot 6H_2O$. The resultant solution was then heated at 60°C for 40 minutes. The final pH of this solution was 1.5–2.0.

Microscopic examination of the first adherend contacting region revealed no changes in the topography thereof (roughness or smoothness) as compared to the first adherend surface of Example I-A..

The joint strength obtained was 520 gms./in. which was much greater than the strength of the joint not colloid treated in Example I-A.

D. To illustrate that the increased joint strengths achieved in Examples I-B and I-C, above, were not due to increased surface roughness, the following was performed. The procedure of Example I-A was repeated except that the polyimide surface (first adherend) was roughened by treatment with one molar aqueous NaOH for 10 seconds at 24°C prior to contact with the epoxy resin-coated aluminum second adherend. The joint strength obtained was 320 gms./in. which was much less than the colloid treated adherends in Examples I-B and I-C, above.

The topography of the aqueous NaOH-treated first adherend was microscopically examined for comparison purposes.

E. For comparison purposes, the procedure of Example I-D was repeated except that the polyimide surface after roughening was coated with the colloidal tin hydrous oxide solution of Example I-B. The joint strength obtained was 720 gms./in. which is much greater than the non-colloid-treated adherend of Example I-D, above. Also, microscopic examination revealed no changes in the topography of the colloid-treated adherend as compared to Example I-D, above.

F. The procedure of Example I-D was repeated to show the effect of surface roughness except the polyimide adherend surface was treated with 10 molar NaOH for 4 minutes at 60°C. The joint strength obtained was 200 gms./in. which was much less than the colloid-treated adherends of Examples I-B, I-C and I-E, above.

The topography of the aqueous NaOH-treated first adherend was microscopically examined for comparison purposes.

G. For comparison purposes with respect to Example I-F, the procedure of Example I-F was repeated except that the polyimide surface after roughening was treated with the tin solution of Example I-B. The joint strength obtained was 500 gms./in. (much greater than that of Example I-F). Also, microscopic examination revealed no changes in the topography (roughness or smoothness) of the colloid-treated adherend as compared to Example I-F.

H. The procedure of Example I-G was repeated except that the polyimide surface after roughening was treated with the iron solution of Example I-C. The joint strength obtained was 450 gms./in. (much greater than that of Example I-F). Also, microscopic examination revealed no changes in the topography (roughness or smoothness) of the colloid-treated adherend as compared to Example I-F, above.

I. The procedure of Example I-B was repeated 3 times with the tin hydrous oxide colloid solution. A peel strength or value could not be obtained for one sample due to cohesive failure within the polyimide itself. This failure indicates a much increased joint strength leading to failure within the adherend itself. No such cohesive failure was observed for non-colloid-treated polyimide adherends treated and tested, as in Example I-A.

J. The procedure of Example I-G was repeated three times with the tin hydrous oxide colloid solution. A peel strength value could not be obtained for two samples due to cohesive failure within the polyimide itself, thereby indicating a much increased joint strength leading to failure within the adherend itself. No such cohesive failure was observed for non-colloid-treated adherends treated and tested as in Example I-F.

K. The procedure of Example I-H was repeated 3 times with the iron hydrous oxide colloid solution. A peel strength value could not be obtained for one of the three samples employed due to cohesive failure within the polyimide itself, thereby indicating a much increased joint strength leading to failure within the adherend itself. No such cohesive failure was observed for non-colloid-treated adherends treated and tested as in Example I-F.

L. For purposes of showing that the increased joint strengths achieved in Examples I-B and I-C, above, are not due to increased wettability of the adhesive to the polyimide adherend surface, the following was performed. The polyimide adherend surface (untreated) was treated with the uncured liquid epoxy adhesive and the contact angle observed. A good measure of the wettability or surface interraction of adherend-adhesive is obtained by contact angle measurements. It was observed that the adhesive spontaneously spread on the polyimide adherend surface. Within several (1–3) minutes the contact angle was less than 5°. Within 30 minutes the contact angle was 0°.

M. The procedure of Example I-L was repeated except that the polyimide surface was first treated with the tin hydrous oxide colloid solution of Example I-B. Within several minutes the contact angle was less than 5°. Within 30 minutes the contact angle was 0°. The results were exactly the same as in Example I-L, thereby indicating no increase in either the rate of or the extent of wettability.

N. The procedure of Example I-L was repeated except that the polyimide surface was first treated with the iron hydrous oxide colloid solution of Example I-C. Within several minutes the contact angle was less than 5°. Within 30 minutes the contact angle was 0°. The results were exactly the same as in Example I-L, thereby indicating no increase in either the rate of or the extent of wettability.

O. The procedure of Example I-F was repeated except that a polyethyleneterephthalate (a polyester) film, commercially obtained, was substituted for the polyimide first adherend. The joint strength obtained was 1,020 gms./in.

P. The procedure of Example I-O was repeated except that the polyethyleneterephthalate adherend surface was treated with the tin hydrous oxide colloid solution of Example I-B. A joint strength of 1,760 gms./in. was obtained which was much greater than the sample of Example I-O which was not colloid solution treated.

EXAMPLE II

A. A first adherend surface comprising a fluorinated copolymer of hexafluoropropylene and tetrafluoroethylene, commercially obtained, was adhesively contacted by a commercially obtained laminate comprising a synthetic rubber adhesive deposited on a polyester backing or support (second adherend). The joint strength was then determined by subjecting the joint to a commercial joint or bond strength testing apparatus whereby a peel or adhesion strength of 100 gms./in. was obtained (180° peel at a rate 10 in./min.).

B. The procedure of Example II-A was repeated except that the fluorinated copolymer adherend surface destined to be contacted was first treated by the tin hydrous oxide colloid solution of Example I-B, by immersion therein for 2 minutes at 25°C. The joint strength obtained was 180 gms./in. which is greater than the sample of Example II-A untreaated with the colloid solution.

C. The procedure of Example II-B was repeated except that the adherend surface was immersed in the iron hydrous oxide colloid solution of Example I-C for 2 minutes at 25°C. The joint strength obtained was 120 gms/in. which is greater than the sample of Example II-A untreated with the colloid solution.

D. The procedure of Example II-A was repeated except that the first adherend comprised the polyimide of Example I-A. The joint strength obtained was 500 gms./in.

E. The procedure of Example II-B was repeated except that the first adherend was the polyimide of Example II-D. A joint strength of 620 gms./in. was obtained for the tin hydrous oxide-treated surface, which is greater than the joint strength of the untreated (colloid) adherend of Example II-D.

F. The procedure of Example II-C was repeated except that the first adherend was the polyimide of Example II-D. A joint strength of 780 gms./in. was obtained for the iron hydrous oxide-treated surface which is greater than the joint strength of the untreated (colloid) adherend of Example II-D.

G. The procedure of Example II-A was repeated except that the first adherend was the polyester of Example I-O. A joint strength of 600 gms./in. was obtained with a peel rate 0.2 in./min.

H. The procedure of Example II-G was repeated except that the polyester adherend surface was immersed in the tin hydrous oxide colloid solution of Example I-B for 2 minutes at 25°C. A joint strength of 900 gms./in. was obtained which is greater than the untreated (colloid) sample of Example II-G.

I. The procedure of Example II-H was repeated except that the adherend surface was immersed in the iron hydrous oxide colloid solution of Example I-C for 2 minutes at 25°C. A joint strength of 740 gms./in. was obtained which was greater than the untreated (colloid) sample of Example II-G.

EXAMPLE III

A. The procedure of Example II-A was repeated except that the first adherend was a commercially pretreated fluorinated copolymer material, commercially obtained. A "T" peel (180° peel) at a rate of 0.2 in./min. was employed. A joint strength of 500 gms./in. was obtained.

B. The procedure of Example III-A was repeated except that the fluorinated copolymer first adherend was tin hydrous oxide colloid solution treated as in Example II-B. A joint strength of 790 gms./in. was obtained for the tin hydrous oxide colloid solution treated adherend (improvement over Example III-A).

C. The procedure of Example III-B was repeated except that the iron hydrous oxide colloid solution of Example II-C was used. A joint strength of 740 gms./in. was obtained for the iron hydrous oxide colloid solution-treated adherend (improvement over Example III-A).

D. The procedure of Example III-A was repeated except that the peel rate was 1 in./min. A joint strength of 740 gms./in. was obtained.

E. The procedure of Example III-B was repeated except that the peel rate was 1 in./min. A joint strength of 870 gms./in. was obtained for the tin hydrous oxide colloid solution-treated adherend (improvement over Example III-D).

F. The procedure of Example III-C was repeated except that the peel rate was 1 in./min. A joint strength of 900 gms./in. was obtained for the iron hydrous oxide colloid solution-treated adherend) improvement over Example III-D).

G. The procedure of Example III-A was repeated except that the peel rate was 10 in./min. A joint strength of 850 gms./in. was obtained.

H. The procedure of Example III-B was repeated except that the peel rate was 10 in./min. A joint strength of 1,310 gms./in. was obtained for the tin hydrous oxide colloid solution-treated surface (improvement over Example III-G).

I. The procedure of Example III-C was repeated except that the peel rate was 10 in./min. A joint strength of 1,300 gms./in. was obtained for the iron hydrous oxide colloid solution-treated surface (improvement over Example III-G).

J. The procedure of Example III-A was repeated except that the first adherend was the polyester of Example I-O. A joint strength of 600 gms./in. was obtained.

K. The procedure of Example III-B was repeated with the polyester adherend of Example III-J. A joint strength of 900 gms./in. was obtained for the tin hydrous oxide colloid solution-treated adherend surface (improvement over Example III-J).

L. The procedure of Example III-D was repeated with the polyester adherend of Example III-J. a joint strength of 700 gms./in. was obtained.

M. The procedure of Example III-E was repeated with the polyester adherend of Example III-J. A joint strength for the tin hydrous oxide colloid solution-treated adherend surface of 1,160 gms./in. was obtained (improvement over untreated adherend of Example III-L).

N. The procedure of Example III-G was repeated with the polyester adherend of Example III-J. A joint strength of 900 gms./in. was obtained.

O. The procedure of Example III-B was repeated except that the polyester adherend of Example III-J was employed. A joint strength of 1,640 gms./in. was obtained for the tin hydrous oxide colloid solution-treated adherend surface (improvement over the untreated adherend of Example III-N).

P. The procedure of Example III-N was repeated except that the polyester adherend surface was pretreated or roughened by immersion in one molar aqueous NaOH for 10 seconds at 25°C. A joint strength of 1,000 gms./in. was obtained.

Q. The procedure of Example III-P was repeated except that the roughened surface was immersed in the tin hydrous oxide colloid solution of Example I-B for 2 minutes at 25°C. A joint strength of 1,620 gms./in. was obtained (improvement over the roughened, colloid solution untreated sample of Example III-P).

R. The procedure of Example III-P was repeated except that the roughening was at 60°C for 4 minutes. A joint strength of 1,300 gms./in. was obtained.

S. The procedure of Example III-Q was repeated except that the roughening was at 60°C for 4 minutes. A joint strength of 1,640 gms./in. was obtained for the tin hydrous oxide colloid-treated adherend surface (improvement over the roughened, untreated (colloid) sample of Example III-R).

T. The procedure of Example III-Q was repeated except that the solution employed was the iron hydrous oxide colloid solution of Example I-C. An adhesive joint strength of 1,660 gms./in. was obtained (improvement over the roughened, untreated [colloid] sample of Example III-R).

U. The procedure of Example III-A was repeated except that the first adherend comprised the polyimide of Example I-A. An adhesive joint strength of 800 gms./in. was obtained.

V. The procedure of Example III-B was employed except that the first adherend comprised the polyimide of Example I-A. An adhesive joint strength of 1,200 gms./in. was obtained for the tin hydrous oxide colloid solution-treated adherend surface (an improvement over the untreated [colloid] sample of Example III-U).

W. The procedure of Example III-R was employed with the polyimide first adherend of Example I-A. A joint strength of 700 gms./in. was obtained.

X. The procedure of Example III-S was employed with the first adherend of Example I-A. A joint strength of 1,100 gms./in. was obtained for the tin hydrous oxide colloid solution-treated adherend surface (improvement over the roughened, untreated [colloid] sample of Example III-W).

EXAMPLE IV

A. The procedure of Example III-N was repeated except that the peel was a 90° peel from a German Wheel at a rate of 10 in./min. A joint strength of 780 gms./in. was obtained.

B. The procedure of Example IV-A was repeated except that the polyester adherend, prior to adhesive, contact was treated with the tin hydrous oxide colloid solution of Example I-B for 2 minutes at 25°C. A joint strength of 1,740 gms./in. was obtained (improvement over the untreated [colloid] adherend of Example IV-A).

C. The procedure of Example III-P was repeated except that the peel was a 90° peel from a German Wheel at a rate of 10 in./min. A joint strength of 890 gms./in. was obtained for the roughened adherend.

D. The procedure of Example III-Q was repeated except that the peel was a 90° peel from a German Wheel at a rate of 10 in./min. A joint strength of 1,626 gms./in. was obtained for the tin hydrous oxide colloid solution-treated adherend (improvement over the untreated [colloid], roughened adherend of Example IV-C).

E. The procedure of Example III-W was repeated except that the peel was a 90° peel from a German Wheel at a rate of 10 in./min. A joint strength of 450 gms./in. was obtained for the roughened adherend.

F. The procedure of Example III-X was repeated except that the peel was a 90° peel from a German Wheel at a rate of 10 in./min. A joint strength for the tin hydrous oxide colloid solution-treated adherend sample of 1,660 gms./in. was obtained (improvement over the untreated [colloid], roughened sample of Example IV-E).

G. The procedure of Example IV-F was repeated except that the adherend surface was treated with the iron hydrous oxide colloid solution of Example I-C for 2 minutes at 25°C. A joint strength of 1,680 gms./in. was obtained (improvement over the roughened, untreated [colloid] sample of Example IV-E).

It is to be understood that the above-described embodiments are simply illustrative of the principles of the invention. Various other modifications and changes may be made by those skilled in the art which will embody the principles of the invention and fall within the spirit and scope thereof.

What is claimed is:

1. In an improved method of joining two bodies by means of an adhesive, which forms a contact angle of 0° with a contacting region of a surface of at least one of the bodies, which comprises:
   a. applying the adhesive to the contacting region; and
   b. contacting together the respective contacting regions of the bodies to obtain a joining thereof, wherein the improvement comprises:
   prior to step (a) above, treating the contacting region with a stable aqueous colloidal solution, formed by a hydrolysis and nucleation reaction, comprising insoluble hydrous oxide particles of an element selected from the group consisting of Be, Mg, Ti, Zr, V, Cr, Mo, W, Mn, Fe, Co, Ni, Pd, Pt, Cu, Ag, Au, Zn, Cd, Hg, Al, In, Tl, Si, Ge, Sn, Pb, Bi, La, Ce, Th, U and mixtures thereof, said particles having a size within the range of 10A to 10,000A and said hydrolysis reaction including at least (1) dissolution of a salt of said selected element in an aqueous medium and (2) maintenance of the pH of said aqueous medium at a point where no flocculate results 2. The method as defined in claim 1 wherein said element comprises Sn.

3. The method as defined in claim 1 wherein said element comprises Fe.

4. The method as defined in claim 1 which further comprises treating the contacted surfaces to obtain a relatively permanent joint.

5. In a method of improving the joint strength of adherends, which comprises:
   a. applying an adhesive, which forms a contact angle of 0° with a contacting surface of both adherends, to a contacting surface of at least one adherend;
   b. positioning the adhesive-coated contacting surface to face the corresponding contacting surface of the other adherend; and
   c. contacting together the facing surfaces to form a joint, wherein the improvement comprises:
   prior to step (c) above, treating either the contacting surface or the adhesive-coated contacting surface of at least one adherend with a stable aqueous colloidal solution, formed by a hydrolysis and nucleation reaction, comprising insoluble hydrous oxide particles of an element selected from the group consisting of Be, Mg, Ti, Zr, V, Cr, Mo, W, Mn, Fe, Co, Ni, Pd, Pt, Cu, Ag, Au, Zn, Cd, Hg, Al, In, Tl, Si, Ge, Sn, Pb, Bi, La, Ce, Th, U and mixtures thereof, said particles having a size within the range of 10A to 10,000A and said hydrolysis reaction including at least (1) dissolution of a salt of said selected element in an aqueous medium and (2) maintenance of the pH of said aqueous medium at a point where no flocculate results.

6. The method as defined in claim 5 wherein said element comprises Sn.

7. The method as defined in claim 5 wherein said element comprises Fe.

8. In an improved method of joining two substrates, which comprises:

applying an adhesive, which forms a contacting angle of 0° with a contacting surface of the two substrates, to a contacting surface of at least one substrate; and contacting the adhesive-coated surface with the contacting surface of the other substrate, wherein the improvement comprises:

applying a stable colloidal aqueous hydrous oxide solution of an element selected from Sn and Fe to at least one interface between the adhesive and the contacting surface.

9. In an improved method of joining two bodies, comprising the steps of:

a. applying an epoxy adhesive to a contacting region of a surface of at least one of the bodies, said epoxy adhesive and contacting region forming an angle of 0°; and b. contacting together the respective contacting regions of the bodies to obtain a joining thereof, wherein the improvement comprises:

prior to step (a) above, treating a contacting region of a surface of at least one of the bodies with a stable aqueous colloidal solution, formed by a hydrolysis and nucleation reaction, comprising insoluble hydrous oxide particles of an element selected from the group consisting of Be, Mg, Ti, Zr, V, Cr, Mo, W, Mn, Fe, Co, Ni, Pd, Pt, Cu, Ag, Au, Zn, Cd, Hg, Al, In, Tl, Si, Ge, Sn, Pb, Bi, La, Ce, Th, U and mixtures thereof, said particles having a size within the range of 10A to 10,000A and said hydrolysis reaction including at least (1) dissolution of a salt of said selected element in an aqueous medium and (2) maintenance of the pH of said aqueous medium at a point where no flocculate results 10. In an improved method of improving the joint strength of adherends comprising at least one adherend selected from the group consisting of a polyimide and a polyester, which comprises:

a. applying a liquid epoxy adhesive, having an epoxide equivalent of 175 to 210 and an average molecular weight of 350 to 400, to a contacting surface of at least one adherend, said epoxy adhesive and contacting surface forming a contact angle of 0°; and b. contacting together the respective contacting surfaces of each adherend to form the joint, wherein the improvement comprises:

prior to step (b) above, treating either the contacting surface or the adhesive-coated contacting surface of at least one adherend with a stable aqueous colloidal solution, formed by a hydrolysis and nucleation reaction, comprising insoluble hydrous oxide particles of an element selected from the group consisting of Be, Mg, Ti, Zr, V, Cr, Mo, W, Mn, Fe, Co, Ni, Pd, Pt, Cu, Ag, Au, Zn, Cd, Hg, Al, In, Tl, Si, Ge, Sn, Pb, Bi, La, Ce, Th, U and mixtures thereof, said particles having a size within the range of 10A to 10,000A and said hydrolysis reaction including at least (1) dissolution of a salt of said selected element in an aqueous medium and (2) maintenance of the pH of said aqueous medium at a point where no flocculate results.

11. The method as defined in claim 1 wherein said adhesive comprises an epoxy adhesive.

* * * * *